S. L. GOLDMAN.
FILTER.
APPLICATION FILED JULY 22, 1910.
1,017,867.
Patented Feb. 20, 1912.
2 SHEETS—SHEET 2.
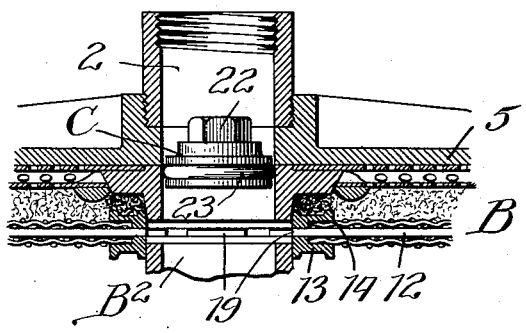
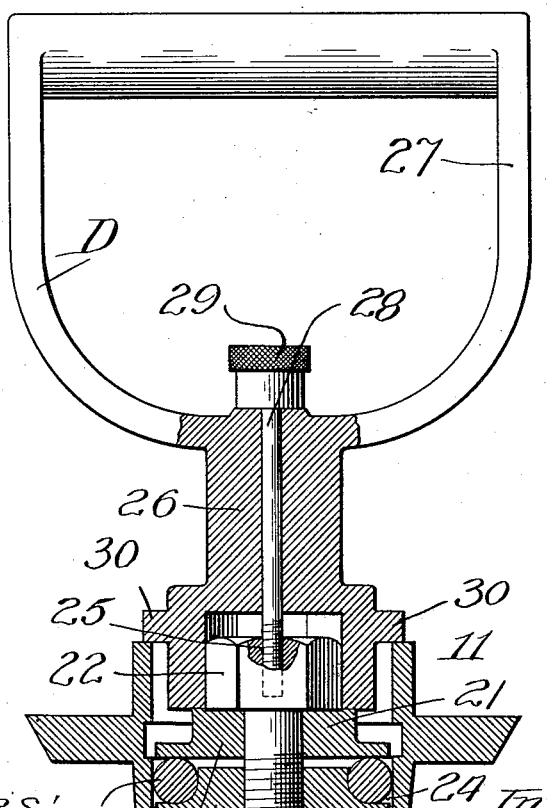

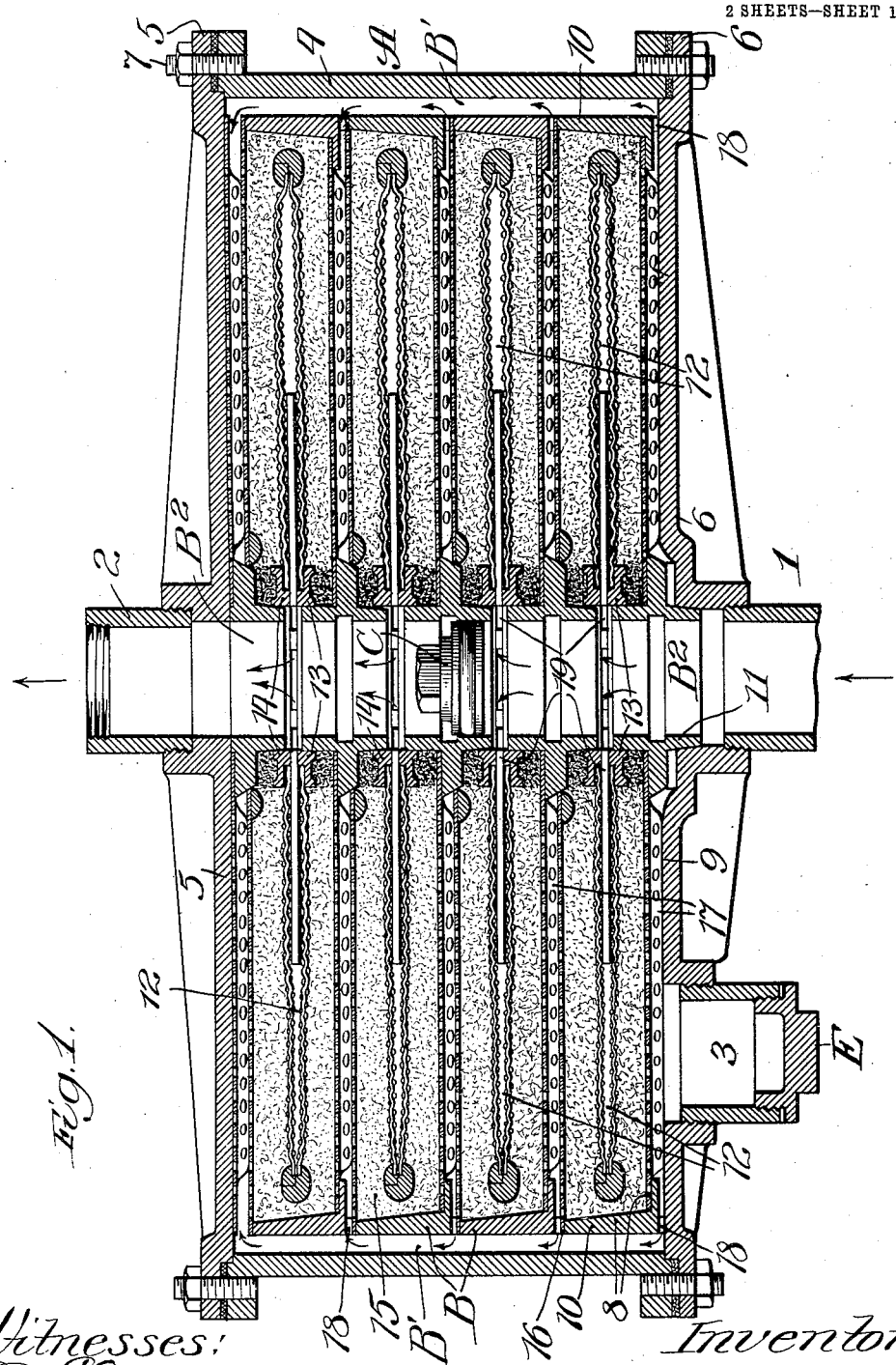

UNITED STATES PATENT OFFICE.

SIGMUND LUDWIG GOLDMAN, OF CHICAGO, ILLINOIS.

FILTER.

1,017,867. Specification of Letters Patent. Patented Feb. 20, 1912.

Application filed July 22, 1910. Serial No. 573,162.

*To all whom it may concern:*

Be it known that I, SIGMUND LUDWIG GOLDMAN, a citizen of the United States, residing at Chicago, in the county of Cook and State of Illinois, have invented a new and useful Improvement in Filters, of which the following is a specification.

My invention relates particularly to filters for use in filtering liquors, such as beer; and my primary object is to provide a simple, inexpensive and sanitary filter which is readily convertible to enable either single or double filtration to be effected, according to desire or necessity.

A further object of the invention is to provide a filter, which, while enabling the foregoing object to be accomplished, will permit liquor to pass through freely at moderate pressure, thus insuring high capacity and lessening the liability to clog.

The invention is illustrated in its preferred embodiment in the accompanying drawings, in which—

Figure 1 represents a vertical sectional view of a filter constructed in accordance with my invention; Fig. 2, a broken sectional view showing the upper central portion of the filter after conversion of the filter to enable it to be used for single filtration; and Fig. 3, a broken sectional view showing a plug employed in connection with the central conduit of the filter and the tool employed for changing the location of said plug.

My invention may be employed in connection with filters of different construction, being illustrated in connection with a filter of the type illustrated in patent to John T. H. Paul No. 834,637, granted October 30, 1906. The filter comprises, in the embodiment shown, a casing A provided with entrance-exit passages 1, 2 and 3; and filter-cells B contained in the casing and forming therewith an annular chamber B', the cells having a central conduit $B^2$, which communicates with the passages 1 and 2 of the casing. Said casing may be of any approved construction. As shown, it comprises a cylinder 4, externally flanged at its ends; and top and bottom ends 5 and 6, respectively, detachably connected with the cylinder, as by bolts 7.

Each cell B comprises, in the form shown, a comparatively shallow circular pan 8 having a radially corrugated perforate bottom 9 and a peripheral flange 10; a conduit-section 11 fitted in a central perforation with which the perforate bottom is provided; a distributer-collector element 12 having conduit-sections 13 and 14 fitted in a central opening with which the distributer-collector element is provided; and filter material 15 above and below the distributer-collector element and filling the pan 8. The conduit-sections have a telescopic relation in a well understood manner, and each cell pan is shown surmounted by a screen or perforate plate 16. The radial corrugations 17 with which the perforate bottoms of the cell pan are provided afford passages for the distribution of the liquor, and the circumferential passages 10 of the cell pans are provided with depending flanges through which extend radial passages 18 which communicate with the radial passages of the cell pan bottoms.

The distributer-collector elements 12 are of well known construction, as illustrated for instance in said Patent No. 834,637, and are provided with passages 19 which communicate with the central conduit $B^2$.

C represents an adjustable plug which may be inserted and secured within the central conduit $B^2$ at any desired point for the purpose of converting the filter to be used either for single filtration or double filtration, at will. The plug C preferably comprises a lower disk 20; an upper disk 21; a cap-screw or bolt 22 connecting said disks; and a rubber gasket 23 interposed between the peripheral portions of said disks, the disk 20 being recessed peripherally on its upper side to afford a seat 24 for said gasket. The head of the bolt 22 is provided with a threaded socket 25 which constitutes means for enabling the plug to be withdrawn from the conduit-section which it occupies.

D represents an implement which may be usefully employed to secure the expansible plug in place in the conduit $B^2$, or to move the same from the conduit; or, if desired, the implement D may be employed to lift one cell from another before the bolt 22 is unscrewed sufficiently to permit the plug to be withdrawn from the conduit-section in which it may be located. The implement D comprises a shank 26 provided at its lower end with a socket adapted to fit over the head of the bolt 22; a handle 27; and a bolt 28 of comparatively small diameter which extends through an axial perforation in the shank 26 and has its lower end threaded and adapted to enter the socket 25 with which the head of the bolt 22 is provided centrally. The bolt or shaft 28 is provided on its upper end with a knurled head 29 which enables the bolt to be turned into or withdrawn from the clamping-bolt 22 of the plug. The shank 26 of the implement is provided with an external flange 30 adapted to rest upon the upper end of a conduit-section. It will be understood that the plug C may be introduced into a conduit-section, and the clamping-bolt 22 may then be screwed down by means of the implement D, thereby compressing the rubber gasket 23 and causing it to expand against the inner surface of the conduit-section, as will be clearly understood from Fig. 3.

If desired, the lifting-bolt 28 may be connected with the bolt 22 of the plug, and the device D may be used as a lifter either to lift the cell when the plug is in the expanded condition, or to lift the plug after the clamping-bolt 22 has been unscrewed to relieve the pressure on the gasket 23.

E represents a threaded plug which may be applied to close either the passage 2 or the passage 3, according to desire.

When the filter is arranged as shown in Fig. 1, with the plug C located approximately at the center of the filter and the plug E closing the passage 3, the filter may be employed for double filtration. In this case the liquor to be filtered may be introduced under pressure through the passage 1 into the lower portion of the central conduit, whence it will pass through the corresponding elements 12, here serving as distributer-elements, thence through the filtering material of the corresponding cells, thence into the annular chamber or passage B' between the filter-cells and the casing, and finally the liquor will enter the cells disposed above the plug C, pass through the filtering material and enter the corresponding elements 12, here serving as collector-elements, from whence the liquor will pass to the upper portion of the central conduit and escape through the passage 2. The operation may be reversed, if desired.

If it be desired to employ the filter for single filtration, the plug C may be shifted so as to occupy a position in the upper portion of the central conduit, as shown in Fig. 2, and the plug E may be removed from the passage 3 and applied at the passage 2. The liquor may then enter through the passage 1, pass through the filter cells and escape by the passage 3, or vice versa.

My invention is applicable to filters of varying constructions wherein there are employed a casing, a plurality of filter-cells within the casing and superposed one above the other, and ingress and egress conduits or passages which may be controlled substantially in the manner disclosed herein.

The foregoing detailed description has been given for clearness of understanding only, and no undue limitation should be understood therefrom, but the appended claims should be construed as broadly as permissible in view of the prior art.

What I regard as new, and desire to secure by Letters Patent, is—

1. In a filter, the combination of a casing, filter-cells within said casing and forming therewith an annular chamber, said filter-cells having a central conduit with upper and lower orifices therefor, an orifice communicating with the interior of the casing at a distance from the center thereof, a plug removably inserted in said central conduit, said plug having means for expanding it within the conduit, and means for closing one of said orifices.

2. In combination with a filter comprising a casing and a plurality of filter-cells therein having a central conduit, of a plug removably inserted in said central conduit, whereby the filter may be employed either for single filtration or double filtration, said plug having expansion means, for the purpose set forth.

3. In combination with a filter comprising a casing and a plurality of filter-cells therein having telescopically related conduit sections, a plug adjustably inserted in said conduit, said plug being capable of adjustment without dismembering the filter.

4. In combination with a filter comprising a casing and a plurality of filter-cells within said casing having telescopically related conduit-sections, an expansible plug in one of said conduit-sections.

5. In a filter, the combination of a casing, a plurality of filter-cells therein having a conduit extending therethrough, and a plug for said conduit comprising a pair of disks, a clamping-bolt, and a gasket interposed between said disks.

6. In a filter, the combination of a casing, a plurality of filter-cells therein having a conduit extending therethrough, and a plug for said conduit comprising a pair of disks, a clamping-bolt, and a gasket interposed between said disks, said clamping-bolt having a head provided with means for applying a lifting-tool.

7. In combination with a filter having a conduit and inlet and outlet orifices, a plug for said conduit having expansion means, said plug adjustable without dismembering the filter.

8. In a filter, the combination of a casing, filter-cells within said casing and forming therewith an annular chamber, said filter-cells having a central conduit with upper and lower orifices therefor, an orifice communicating with the interior of the casing at a distance from the center thereof, a plug removably inserted in said central conduit and withdrawable without dismemberment of the filter, and a plug for one of said orifices, for the purpose set forth.

SIGMUND LUDWIG GOLDMAN.

In presence of—
J. G. ANDERSON,
W. T. JONES.